(12) United States Patent
Zanfei et al.

(10) Patent No.: US 9,108,495 B2
(45) Date of Patent: Aug. 18, 2015

(54) WHEEL FOR PEDAL-ASSISTED BIKES (75) Inventors: Adriano Zanfei, Rovereto (FR); Fabio Giorgi, Rovereto (IT)

(73) Assignee: C.R.D. CENTRO RICERCHE DUCATI TRENTO S.R.L., Rovereto (IT)

( * ) Notice: Subject to any disclaimer, the term of this patent is extended or adjusted under 35 U.S.C. 154(b) by 0 days.

(21) Appl. No.: 14/004,915

(22) PCT Filed: Mar. 12, 2012

(86) PCT No.: PCT/IB2012/000455
§ 371 (c)(1),
(2), (4) Date: Sep. 25, 2013

(87) PCT Pub. No.: WO2012/123800
PCT Pub. Date: Sep. 20, 2012

(65) Prior Publication Data
US 2014/0008964 A1 Jan. 9, 2014

(30) Foreign Application Priority Data

Mar. 16, 2011 (IT) .............................. MO2011A0061

(51) Int. Cl.
*A63G 25/00* (2006.01)
*B60K 7/00* (2006.01)
*B62M 6/65* (2010.01)
(52) U.S. Cl.
CPC ................ *B60K 7/0007* (2013.01); *B62M 6/65* (2013.01)
(58) Field of Classification Search
USPC ............... 280/200, 208; 180/205, 206, 206.1, 180/219, 220, 227, 228
See application file for complete search history.

(56) References Cited

U.S. PATENT DOCUMENTS

| 4,952,196 A | * | 8/1990 | Chilcote et al. | 474/70 |
| 5,440,945 A | * | 8/1995 | Penn | 74/117 |

(Continued)

FOREIGN PATENT DOCUMENTS

| DE | 200 20 613 | 3/2001 |
| FR | 2 873 090 | 1/2006 |

(Continued)

OTHER PUBLICATIONS

International Search Report dated Jul. 5, 2012, corresponding to PCT/IB2012/000455.

*Primary Examiner* — John Walters
*Assistant Examiner* — James Triggs
(74) *Attorney, Agent, or Firm* — Young & Thompson (57) ABSTRACT Wheel for pedal-assisted bikes includes:
a fixed structure associable with the frame of a bike having a driving pedal crank;
  a circle element mounted on the structure for rotation around a main rotation axis;
  a propulsion disc rotatably mounted on the structure and connectable to the crank;
  an electric motor associated with the structure and for cooperating with the propulsion disc to motorize the circle element; and
transmission elements for transmitting rotary motion from the disc to the circle element which include a first detection device for detecting the force transmitted to the circle element from the disc, and including:
a first plate associated in rotation with one of the disc and the circle element;
a second plate associated with the other of the disc and the circle element;
at least a motion transmission part between the first plate and second plate.

17 Claims, 7 Drawing Sheets

(56) References Cited

U.S. PATENT DOCUMENTS

| | | | | |
|---|---|---|---|---|
| 6,072,717 | A  * | 6/2000 | Brug et al. | 365/171 |
| 6,725,733 | B1 * | 4/2004 | Feller | 73/861.74 |
| 7,624,656 | B2 * | 12/2009 | Parks et al. | 74/63 |
| 8,636,095 | B2 * | 1/2014 | Ito | 180/206.6 |
| 2008/0234090 | A1 * | 9/2008 | Nicolai | 475/149 |

FOREIGN PATENT DOCUMENTS

| | | |
|---|---|---|
| JP | 2003 095180 | 4/2003 |
| WO | 2010/068101 | 6/2010 |
| WO | 2010/091323 | 8/2010 |

* cited by examiner

WHEEL FOR PEDAL-ASSISTED BIKES

TECHNICAL FIELD

The present invention relates to a wheel for pedal-assisted bikes.

BACKGROUND ART

Pedal-assisted bikes are bicycles with an auxiliary electric motor having the following specifications:
- maximum continuous power rating of the electric motor: 0.25 kW;
- motor supply gradually reduced and interrupted when 25 km/h is achieved;
- motor supply interrupted before 25 km/h if the cyclist stops pedalling.

The electric motor is controlled by means of a processing and control unit which controls the power supply according to the pedal force of the user, balancing the engagement of the transmission gradually from when pedalling starts, to make this smooth and regular.

For this purpose, pedal-assisted bikes have a force sensor in correspondence to the pedals or a speed sensor positioned in the pedal crank or both.

In traditional pedal-assisted bikes, the electric motor is housed directly in the hub of the motorised wheel and is powered by a battery pack which, instead, is fitted on the bicycle frame.

Considering the need to equip the bike with all the aforementioned components designed to perform various different functions, the traditional pedal-assisted systems are usually conceived, right from the design stage, to be fitted on a specific bike model.

Only rarely in fact is it possible to develop a kit able to adapt to several bike models, taking into account the considerable differences between the bicycles on the market, in particular their frames which, of course, have shapes and dimensions so different as to prevent a practical and complete standardisation of pedal-assisted systems.

It must also be underlined that the fitting of a kit for pedal-assisted bikes during the after-sales stage, even if this were possible, usually calls for the performance of inconvenient and not very practical operations concerning the adjustment and the fitting of the various components to the frame which more often than not cannot be performed by the end user and requires the intervention of an expert technician.

To partially overcome the aforementioned drawbacks, the integration is known in the motorised wheel of not only the electrical drive motor but also of the battery pack, as described for example in the patent document WO 2010/091323.

This constructive solution however is not without drawbacks either.

In this respect, it should first of all be noticed that the integration of the battery pack in the motorised wheel only in part simplifies pedal-assisted system fitting and removal operations because it in any case remains necessary to install force and/or speed sensors on the bike pedal crank, as well as all other components.

To this must be added that, quite apart from where the battery pack is positioned either on the wheel or on the frame, the motorised wheels for pedal-assisted bikes can not always be combined in a practical and easy way with the traditional mechanical gears usually used to reduce or multiply the motion transmission ratio from the pedal crank. The fact that the hub of the motorised wheel is almost completely occupied by the electric motor in fact determines the fact that this wheel cannot be combined with gear change devices inside the hub, such as, e.g., the Rohloff gear change but can only be combined with external devices, such as traditional derailleur gears, which nevertheless are not standardised and vary according to the bike model.

DESCRIPTION OF THE INVENTION

The main object of the present invention is to provide a wheel for pedal-assisted bike that can be fitted on any traditional already-existing bike model, providing this, in a practical, easy and functional way, with the functions of pedal-assisted bikes.

Another object of the present invention is to provide a wheel for pedal-assisted bikes that allows overcoming the mentioned drawbacks of the background art within the ambit of a simple, rational, easy and effective to use as well as low cost solution.

The above mentioned objects are achieved by the present wheel for pedal-assisted bikes, comprising:
- at least a fixed structure associable with the frame of a bike having a driving pedal crank;
- at least a circle element mounted on said fixed structure in a rotatable way around a main rotation axis;
- at least a propulsion disc mounted on said fixed structure in a rotatable way and connectable to said driving pedal crank;
- motion transmission means for the transmission of the rotary motion from said propulsion disc to said circle element, and comprising at least a speed gear device suitable for changing the motion transmission ratio from said propulsion disc to said circle element; and
- at least an electric motor associated with said fixed structure and suitable for cooperating with said propulsion disc to motorize said circle element;

characterised in that said speed gear device comprises:
- an annulus gear with internal teeth, associated with said propulsion disc;
- at least a first group of planet gears, made integral with each other and having a different number of teeth, of which at least one primary planet gear engaging with said annulus gear;
- a planet carrier body which supports said first group of planet gears;
- a second group of sun gears, having a different number of teeth and engaging with a respective planet gear, of which at least one primary sun gear engaging with said primary planet gear; and
- a locking device for the selective locking of said sun gears, suitable for preventing alternately the rotation of only one of said sun gears and to release the rotation of the remaining ones, the transmission ratio between said annulus gear and said planet carrier body being established by which sun gear is locked.

BRIEF DESCRIPTION OF THE DRAWINGS

Other characteristics and advantages of the present invention will become more evident from the description of a preferred, but not sole, embodiment of a wheel for pedal-assisted bikes, illustrated purely as an example but not limited to the annexed drawings in which.

EMBODIMENTS OF THE INVENTION

With particular reference to such Figures, globally indicated by 1 is a wheel for pedal-assisted bikes.

The wheel 1 is set to be fitted on any type of bike B having a frame T and a driving pedal crank P.

Figure 1:
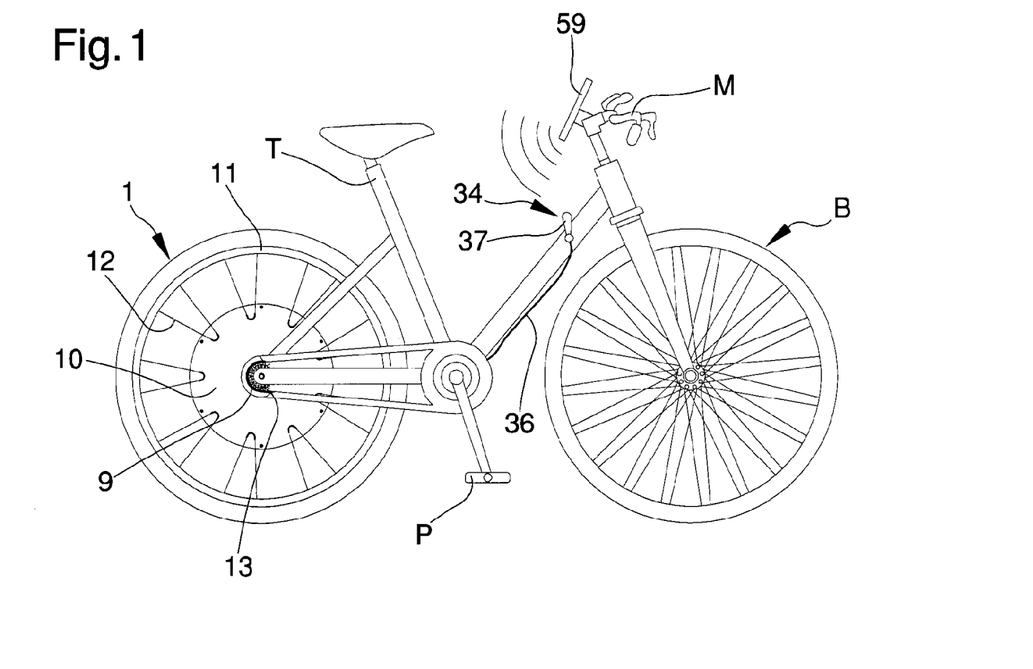
FIG. 1 is a side view of a bike with the wheel according to the invention.
Figure 2:
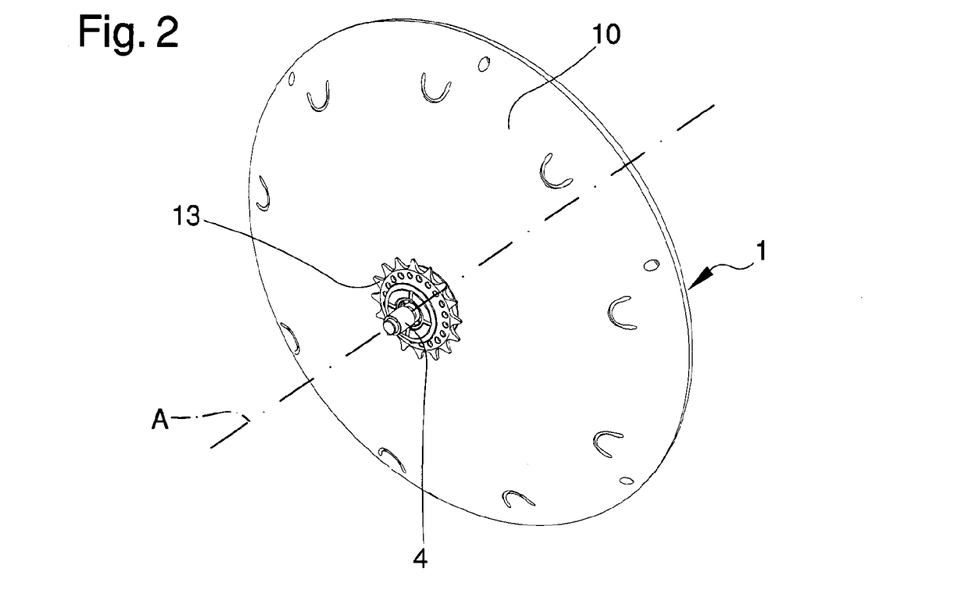
FIG. 2 is an axonometric view of a portion of the wheel according to the invention.
Figure 3:
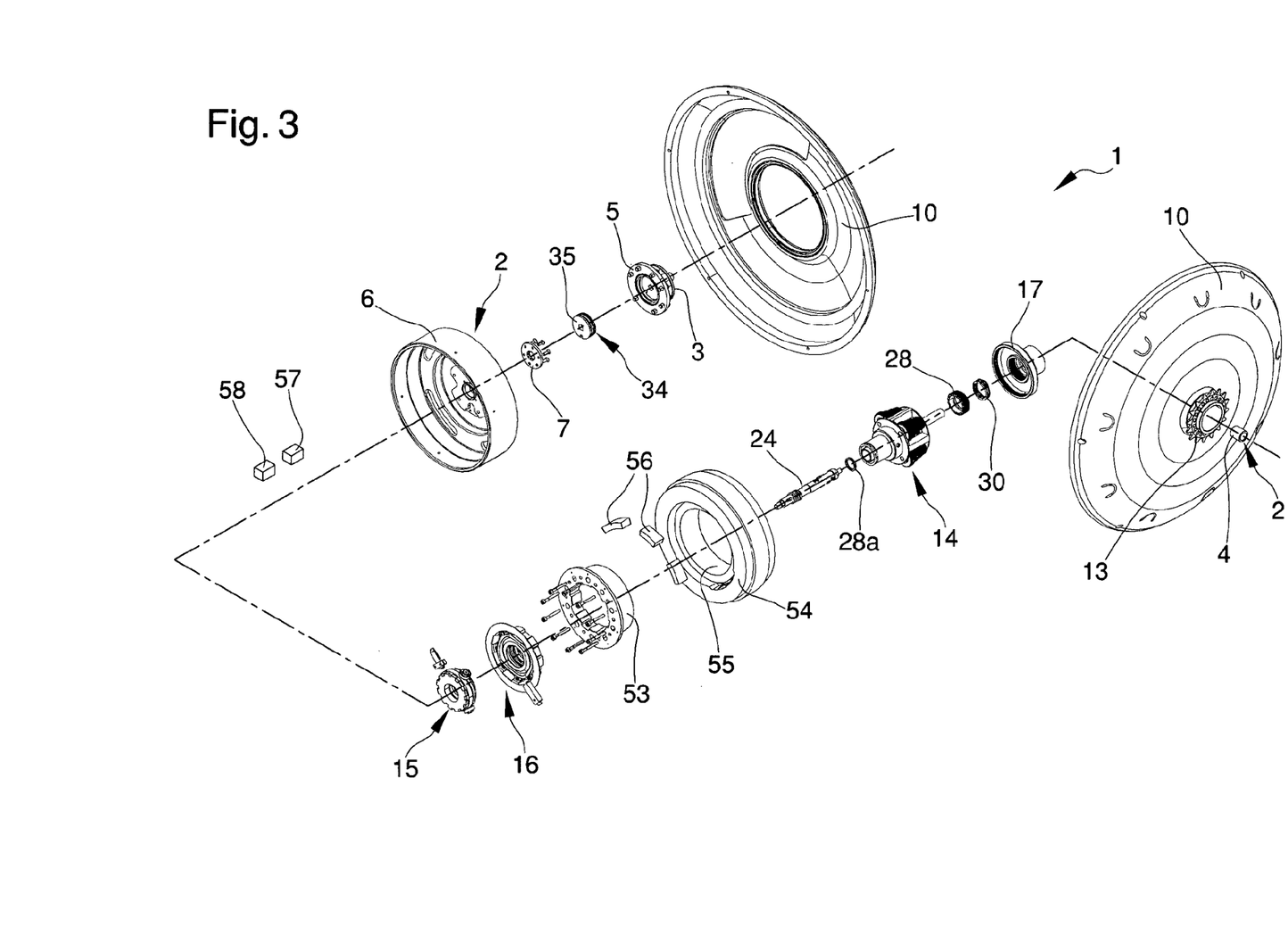
FIG. 3 is an exploded view of the portion of wheel in FIG. 2.
Figure 4:
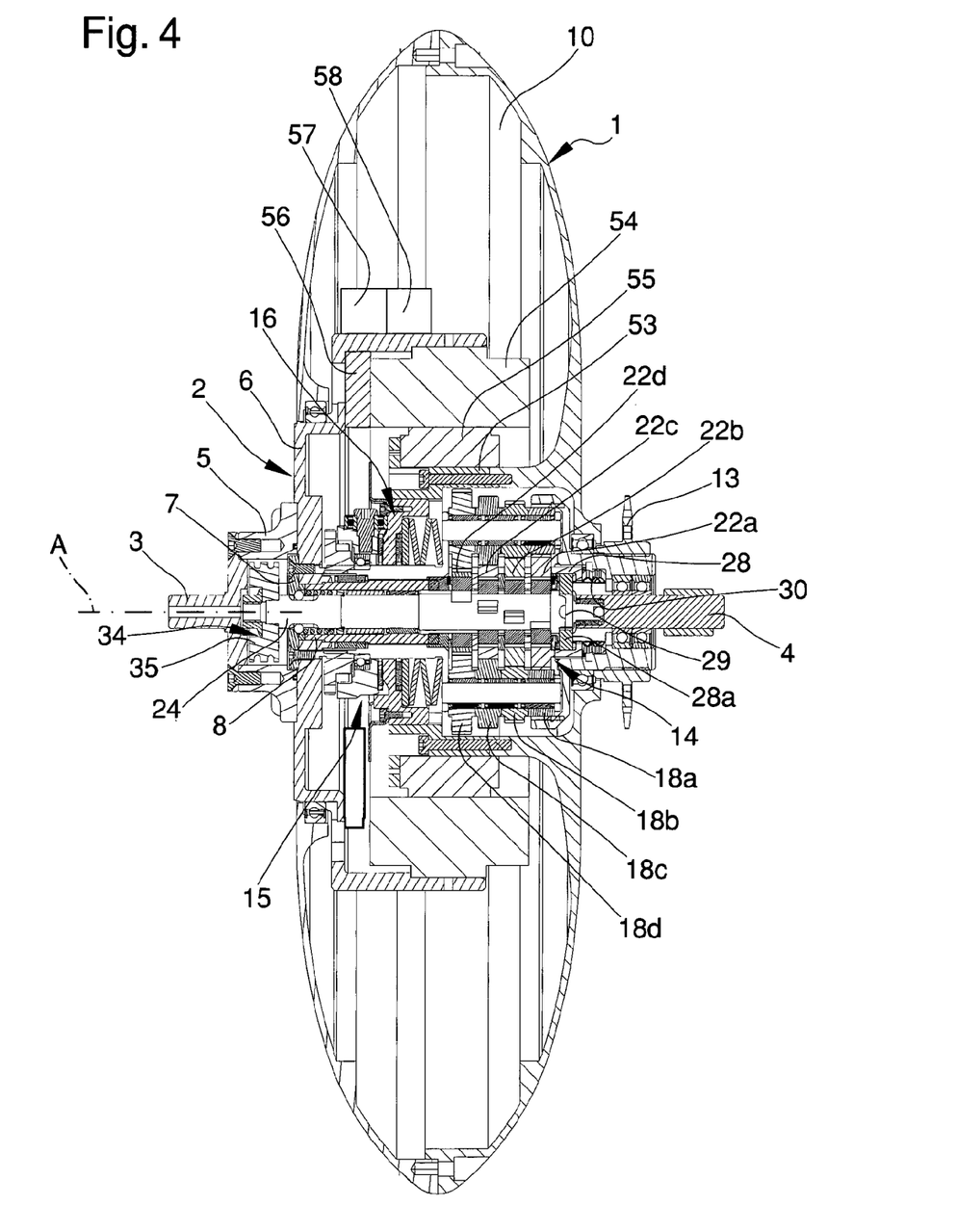
FIG. 4 is an axial section view of the portion of wheel in FIG. 2.
Figure 5:
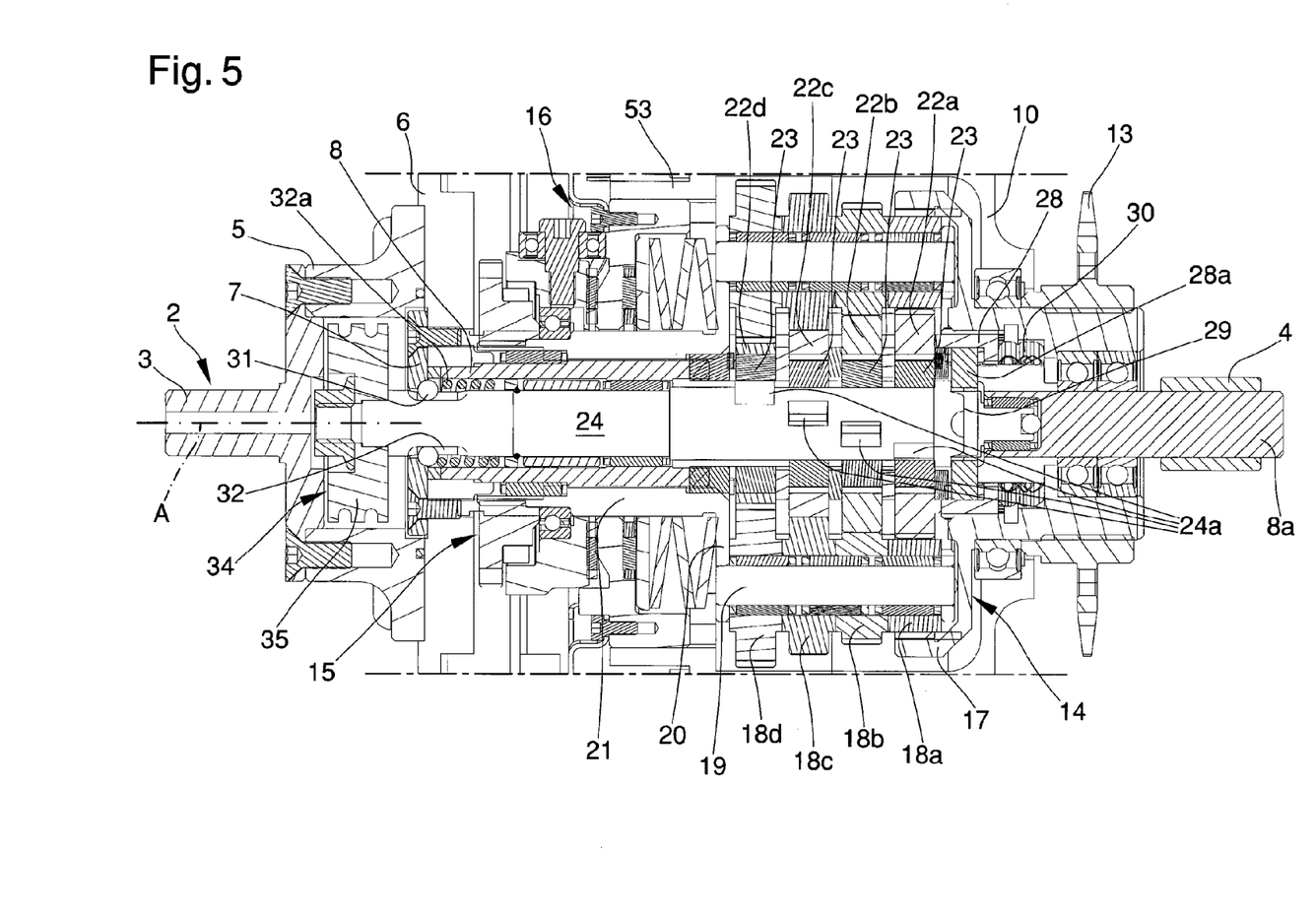
FIG. 5 is a section view, on enlarged scale, of a detail of FIG. 4.
Figure 6:
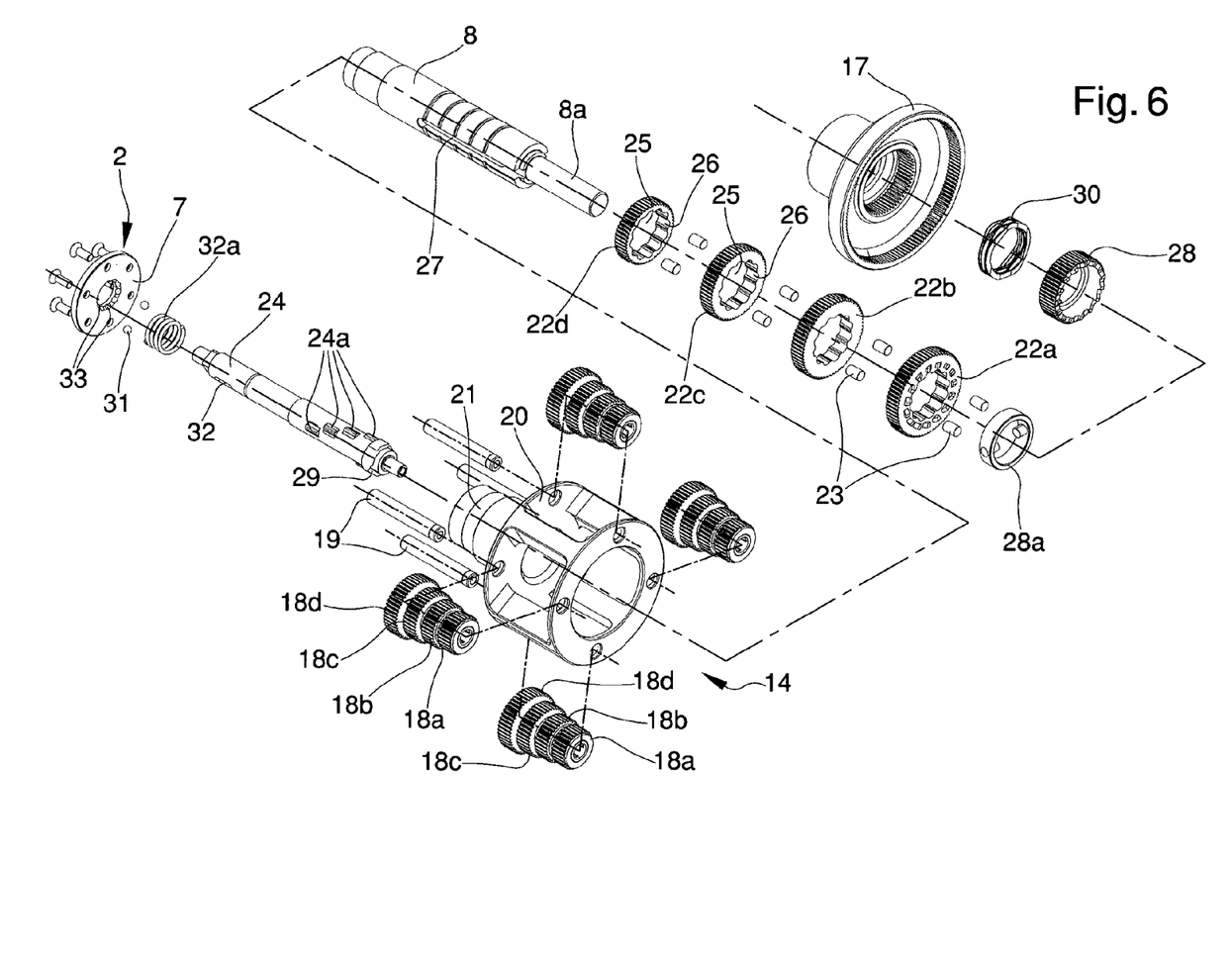
FIG. 6 is an exploded view of the speed gear device of the wheel according to the invention.
Figure 7:
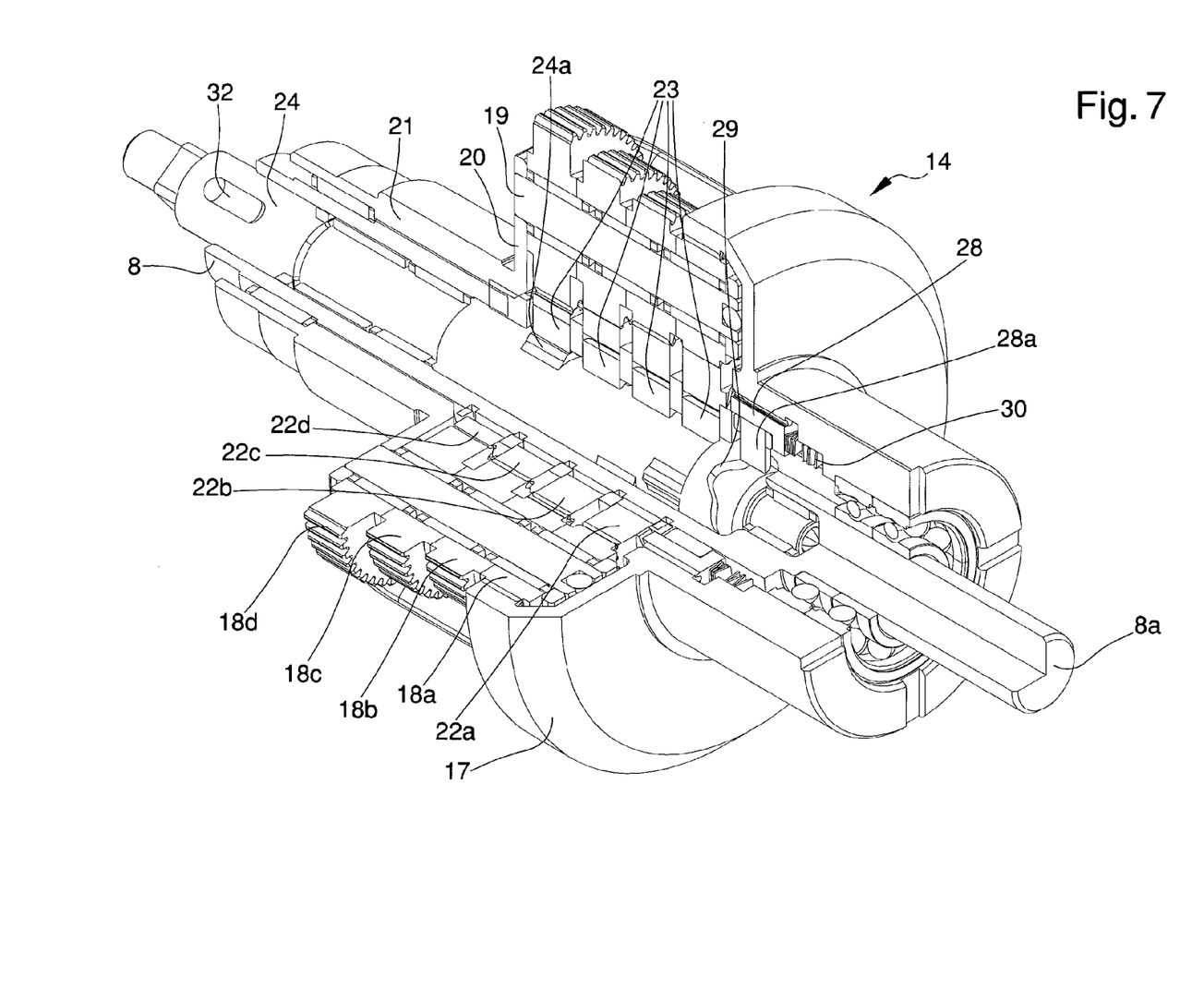
FIG. 7 is a broken view of the speed gear device of the wheel according to the invention.

In the particular embodiment shown in FIG. 1, for example, the wheel 1 is fitted as rear wheel of the bike B.

For this purpose, the wheel 1 comprises a fixed structure 2 which is associable with the rear part of the frame T and which, in particular, has a first axle 3 and a second axle 4 arranged on opposite sides of the wheel 1 and fixable to the frame T in a way in itself traditional.

The first axle 3 is rigidly associated with a cup element 5, in turn rigidly associated with a disc element 6, at the centre of which a plaque 7 is screwed on and a sleeve 8 is interlocked.

The sleeve 8 ends up with a pin extremity 8a which supports or defines the second axle 4.

In the particular embodiment shown in the illustrations, the fixed structure 2 is therefore made up of the axles 3, 4, of the cup element 5, of the disc element 6, of the plaque 7 and of the sleeve 8.

On the fixed structure 2 is fitted in a rotatable way a circle element 10, 11, 12.

The circle element 10, 11, 12 can turn with respect to the fixed structure 2 around a main rotation axis A coaxial with the axles 3, 4.

The circle element 10, 11, 12 comprises:
- a central boxed casing 10, with a substantially discoid shape;
- an external circular framework 11, supporting a tyre for the circulation of the bike B on the road; and
- a series of tie-rods 12 for connecting the central boxed casing 10 to the external circular framework 11.

In correspondence to the second axle 4 of the fixed structure 2 is fitted in a rotatable way a propulsion disc 13, e.g., of the traditional gear pinion type, which can be connected to the driving pedal crank P by means of a flexible part 9 such as a chain or the like.

With the propulsion disc 13 are associated motion transmission means 14, 15, 16 suitable for transferring the rotation motion from the propulsion disc 13 to the circle element 10, 11, 12.

The motion transmission means 14, 15, 16 comprise:
- a speed gear device 14 suitable for changing the motion transmission ratio from the propulsion disc 13 to the circle element 10, 11, 12;
- a freewheel mechanism 15; and
- a first detection device 16 suitable for detecting the force (or, in other words the torque) coming from the propulsion disc 13 and transmitted to the circle element 10, 11, 12.

More in detail, it is underlined that the succession of connections along which the motion is transmitted from the propulsion disc 13 to the circle element 10, 11, 12 is the following: the propulsion disc 13 is associated with the speed gear device 14 which is associated with the freewheel mechanism 15 which is associated with the first detection device 16 which is associated with the circle element 10, 11, 12.

The speed gear device 14 is substantially coaxial to the main rotation axis A and is of the planetary type.

More in detail, the speed gear device 14 comprises:
- an annulus gear 17 with inner teeth, fitted on the second axle 4 in a rotatable way around the main rotation axis A and on which the propulsion disc 13 is keyed;
- a plurality of first groups of planet gears 18a, 18b, 18c, 18d. The planet gears 18a, 18b, 18c, 18d of each first group are made integral with one another and have a different number of teeth. In particular, the planet gears 18a, 18b, 18c, 18d of each group are made separately and then joined together, e.g. by welding or slot-in coupling. In the particular embodiment shown in the illustrations, there are four planet gears 18a, 18b, 18c, 18d for each group and they have a primary planet gear 18a engaging with the inner teeth of the annulus gear 17, a secondary planet gear 18b adjacent to the primary one, a tertiary planet gear 18c adjacent to the secondary one and a quaternary planet gear 18d adjacent to the tertiary one. Alternative embodiments cannot however be ruled out having a different number of planet gears 18a, 18b, 18c, 18d;
- a planet carrier body 19, 20, 21 supporting the first groups of planet gears 18a, 18b, 18c, 18d. The planet carrier body 19, 20, 21, in particular, has a series of axes 19 supporting in a rotatable way the first groups of planet gears 18a, 18b, 18c, 18d and which are associated with a transversal plate 20 terminating in a coupling 21, which is fitted around the sleeve 8, is rotatable coaxially with the main rotation axis A and represents the exit motor body of the speed gear device 14;
- a second group of sun gears 22a, 22b, 22c, 22d, which are not directly connected the one to the other and can turn with different rotation speeds around the main rotation axis A. The sun gears 22a, 22b, 22c, 22d have a different number of teeth and engage with a respective planet gear 18a, 18b, 18c, 18d of each first group. In particular, the sun gears 22a, 22b, 22c, 22d are split into a primary sun gear 22a engaging with the primary planet gear 18a, a secondary sun gear 22b engaging with the secondary planet gear 18b, a tertiary sun gear 22c engaging with the tertiary planet gear 18c and a quaternary sun gear 22d engaging with the quaternary planet gear 18d; and
- a locking device 23, 24 for the selective locking of the sun gears 22a, 22b, 22c, 22d. The locking device 23, 24, in particular, is suitable for preventing alternatively the rotation of just one of the sun gears 22a, 22b, 22c, 22d and releasing the rotation of the remaining ones. This way, the transmission ratio between the annulus gear 17 and the planet carrier body 19, 20, 21 depends on which sun gear 22a, 22b, 22c, 22d remains locked.

All the sun gears 22a, 22b, 22c, 22d comprise a central hole 25 which allows them to be positioned around the sleeve 8 and the housing of the locking device 23, 24.

The central holes 25 of the sun gears 22a, 22b, 22c, 22d are shaped so as to define a plurality of grooves 26.

Advantageously, the locking device 23, 24 comprises two groups of locking bodies 23, arranged on diametrically opposite sides of the main rotation axis A and fitted in succession along two corresponding longitudinal slots 27 obtained in the sleeve 8.

The operation of the locking bodies 23 of one group is the same as those of the other group and, consequently, to make exposition easier in the rest of the present description, reference will be made to just one group of locking bodies 23.

Figures 8, 9, 10:
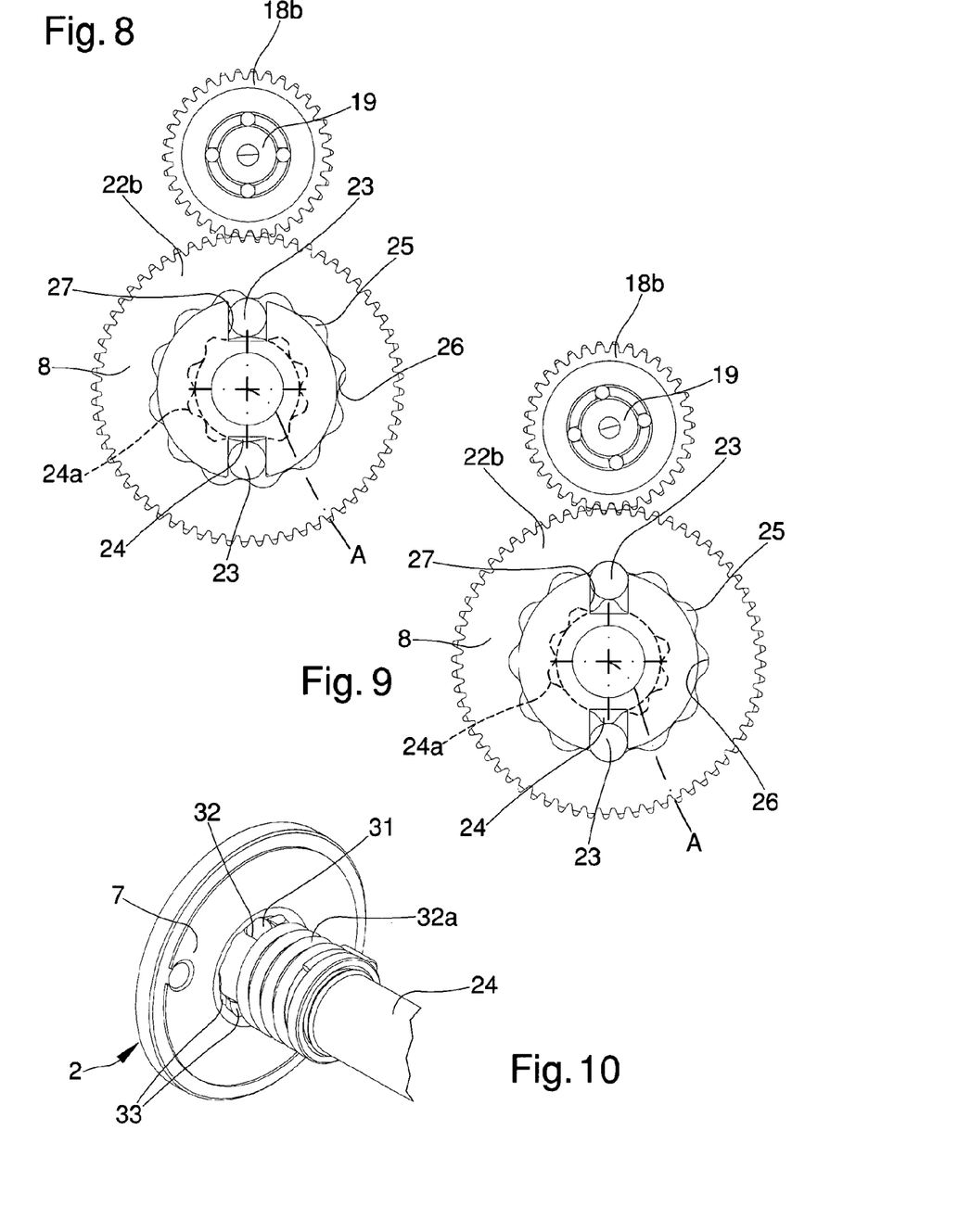
FIG. 8 is a crosswise, schematic and partial section view, which shows the speed gear device of the wheel according to the invention with one of the sun gears in release position.
FIG. 9 is a crosswise, schematic and partial section view, which shows the speed gear device of the wheel according to the invention with one of the sun gears in locking position.
FIG. 10 is an axonometric view which shows a portion of the speed gear device of the wheel according to the invention.

Each locking body 23 is housed in the longitudinal slot 27 in correspondence to the central hole 25 of a respective sun gear 22a, 22b, 22c, 22d and is mobile perpendicular to the main rotation axis A between a locking position, wherein it is fitted in one of the grooves 26 obtained in the respective sun gear 22a, 22b, 22c, 22d preventing its rotation (FIG. 9), and a release position wherein it is moved away from the grooves 26 and the respective sun gear 22a, 22b, 22c, 22d is released (FIG. 8).

The locking device 23, 24, furthermore, comprises an operating shaft 24 which is housed in the sleeve 8 and, therefore, is arranged inside the central holes 25 coaxially to the sun gears 22a, 22b, 22c, 22d.

The operating shaft 24 has two series of eccentric profiles 24a, one for each group of locking bodies 23.

The eccentric profiles 24a are suitable for cooperating with the locking bodies 23 for their movement between the locking position and the release position.

The angular positions of the eccentric profiles 24a are substantially staggered the one to the other (in particular by around 36°) and the operating shaft 24 is rotatable around its own axis, coinciding with the main rotation axis A, in a series of operative angular positions wherein one of the eccentric profiles 24a places the corresponding locking body 23 in the locking position while the other locking bodies 23 remain in release position.

Usefully, the speed gear device 14 also comprises a solidarization mechanism 28, 29 suitable for making the annulus gear 17 and the planet carrier body 19,20,21 integral with each other.

The solidarization mechanism 28, 29 comprises:
- a solidarization element 28 secured to the annulus gear 17 in a prismatic way, i.e., it cannot rotate with respect to this but is sliding along a direction parallel to the main rotation axis A between a coupling position, wherein the solidarization element 28 is rigidly engaged with the primary sun gear 22a, and an idle position, wherein the solidarization element 28 is moved away and released from the primary sun gear 22a; and
- a helical profile 29 obtained on the operating shaft 24 and suitable for cooperating with an auxiliary element 28a associated with the solidarization element 28 for its movement between the coupling position and the idle position in contrast to an elastic return body 30, of the type of a spring or the like.

In practice, with reference to the particular embodiment of the invention shown in the illustrations, the operating shaft 24 can be placed in four operative angular positions, corresponding to the selective locking of the four sun gears 22a, 22b, 22c, 22d and to the positioning of the solidarization element 28 in idle position, and in a fifth operative angular position, corresponding to the release of all four sun gears 22a, 22b, 22c, 22d and to the placement of the solidarization element 28 in coupling position.

Advantageously, a retention mechanism 31, 32, 33 is also provided suitable for retaining the operating shaft 24 in the operative angular positions.

The retention mechanism 31, 32, 33 comprises two retention bodies 31, of the type of two small balls or the like, fitted in two corresponding longitudinal grooves 32 obtained on the operating shaft 24.

Along the longitudinal grooves 32, in practice, the two retention bodies 31 are secured to the operating shaft 24 in a way sliding along a direction parallel to the main rotation axis A between an engaged position, wherein the retention bodies 31 are fitted in corresponding seats 33 obtained on the plaque 7 of the fixed structure 2, and a disengaged position, wherein the retention bodies 31 are moved away and released from the seats 33.

The plaque 7, in particular, has a plurality of seats 33, at least one for each operative angular position (FIG. 10).

The small balls 31 are pushed towards the seats 33 by means of a spring 32a which tends to keep them in engaged position until, by means of the application of an external force, the operating shaft 24 is made to rotate around itself forcing the small balls 31 into the disengaged position until the subsequent operative angular position is reached.

For the selection of the transmission ratio by a user, the speed gear device 14 has a control system 34.

The control system 34 consists of an actuator element for placing in rotation the operating shaft 24 around its own axis between the different operative angular positions.

In the particular embodiment shown in the illustrations, the actuator element 34 comprises a coupling body 35, with a substantially cylindrical shape, which is housed in the cup element 5, is keyed to one extremity of the operating shaft 24 and is to be connected to a control wire 36.

The control wire 36, in particular, can consist of a tie rod having one extremity stably attached to the coupling body 35 and the opposite extremity associated with a control lever 37, located on the frame T of the bike B.

Alternative embodiments of the invention are however possible wherein the actuator element 34 consists in a motorized body, of the type of an electric actuator, of the step-by-step or continuous type, which is intended to make the operating shaft 24 rotate in an automated way and is interlocked with an electronic start signal given by the user. Around the coupling 21 of the planet carrier body 19, 20, 21 are arranged both the freewheel mechanism 15 and the first detection device 16, which allow the motion to be transmitted from the planet carrier body 19, 20, 21 to the circle element 10, 11, 12. The wheel 1 usefully has also an electric motor 54, 55, which is associated with the disc element 6 of the fixed structure 2 and is suitable for cooperating with the motion coming from the driving pedal crank P and from the propulsion disc 13 to motorise the circle element 10, 11, 12.

The electric motor 54, 55 comprises a statoric element 54 fitted on the disc element 6 and a rotoric element 55 associated with a supporting hub 53 which is rigidly associated with the circle element 10, 11, 12.

The electric motor 54, 55 is e.g. of the Torque type with permanent or reluctance magnets or the like, with the statoric element 54 and the rotoric element 55 which are substantially ring-shaped and are arranged one inside the other substantially around the motion transmission means 14, 15, 16.

Such particular solution permits reducing the overall measurements in a practical and functional way.

For the power supply of the electric motor 54, 55, the wheel 1 has a power supply unit 56 associated with the disc element 6 of the fixed structure 2.

The power supply unit 56 is made up, e.g., of one or more battery packs operatively connected to the statoric element 54 of the electric motor 54, 55.

On the fixed structure 2 is also fitted a processing and control unit 57 which is operatively connected to the first detection device 16, to the second detection device 41, 42, 43 and to the electric motor 54, 55 and is suitable for commanding the start of the electric motor 54, 55 depending on the force detected by the first detection device 16 and, if necessary, on other programmable operating parameters.

The processing and control unit 57 is associated with a wireless data transmission device 58, of the radio wave, Bluetooth type or the like, suitable for interfacing the processing and control unit 57 with an external electronic device 59, having a display screen and usable by a user.

The external electronic device 59 consists, e.g., of a dedicated on-board computer or of a software installable on the user's cell phone; in both cases, the external electronic device 59 can be fitted in a practical and convenient way on the handlebars M of the bike B and can be used to display the operating data of the processing and control unit (bike speed, pedalling speed, pedalling force, etc.) and to set the operating parameters. It must also be underlined that in the event of the actuator element 34 consisting in a motorised part interlocked with an electronic start signal given by the user, the processing and control unit 57 can be set to manage the operation of this motorised part, if necessary by interfacing the external electronic device 59 and enabling the user to select the most suitable transmission ratio during riding, giving commands onto the external electronic device 59.

Usefully, the central boxed casing 10 of the circle element 10, 11, 12 is suitable for containing the main mechanical and electronic components of the wheel 1, in particular the motion transmission means 14, 15, 16, the electric motor 54, 55, the power supply unit 56 and the processing and control unit 57, but also the wireless data transmission device 58.

The operation of the present invention is the following.

During normal use of the bike B, the thrust produced by the user on the driving pedal crank P is transferred to the propulsion disc 13 which drags the annulus gear 17 in rotation.

Depending on the transmission ratio selected by means of the control system 34, the rotation motion is transferred from the annulus gear 17 to the coupling 21 which drags the freewheel mechanism 15 in rotation.

By means of the freewheel mechanism 15 the rotation is transferred from the coupling 21 as long as the user applies to the driving pedal crank P a rotation equal to or greater than that of the circle element 10, 11, 12.

From the freewheel mechanism 15, the thrust generated on the driving pedal crank P is transmitted to the first detection device 16 and to the circle element 10, 11, 12.

During such transmission, the first detection device 16 gives an electronic signal corresponding to the transmitted force, this signal being processed by the processing and control unit 57 to control or not the start of the electric motor 54, 55 depending on a mapping of pre-set parameters.

In the event of the electric motor 54, 55 being started, between the statoric element 54 and the rotoric element 55 a force is produced having the same direction of movement as the bike B which aids the pedalling of the user in making the wheel 1 rotate.

The invention claimed is:

1. A wheel for pedal-assisted bikes, the wheel comprising:
   at least a fixed structure associable with the frame of a bike having a driving pedal crank;
   at least a circle element mounted on said fixed structure in a rotatable manner around a main rotation axis;
   at least a propulsion disc mounted on said fixed structure in a rotatable manner and connectable to said driving pedal crank;
   motion transmission means for the transmission of the rotary motion from said propulsion disc to said circle element, the motion transmission means comprising at least a speed gear device configured to change the motion transmission ratio from the propulsion disc to the circle element; and
   at least an electric motor associated with said fixed structure and configured to cooperate with said propulsion disc to motorize said circle element,
   wherein the speed gear device includes:
     an annulus gear with internal teeth, associated with said propulsion disc,
     at least a first group of planet gears made integral with each other and having a different number of teeth, of which at least one primary planet gear engages with said annulus gear,
     a planet carrier body which supports said first group of planet gears,
     a second group of sun gears having a different number of teeth and engaging with a respective planet gear, of which at least one primary sun gear engages with said primary planet gear, and
     a locking device for selective locking of said sun gears, the locking device configured to prevent alternately the rotation of only one of said sun gears and to release the rotation of the remaining sun gears, the transmission ratio between said annulus gear and said planet carrier body being established by which of the sun gears is locked.

2. The wheel according to the claim 1, wherein said speed gear device is substantially coaxial to said main rotation axis.

3. The wheel according to the claim 1, wherein said sun gears comprise a central hole for housing said locking device.

4. The wheel according to the claim 3, wherein said locking device comprises at least a group of locking bodies, each of the locking bodies being housed in said central hole of a respective sun gear and being mobile perpendicular to said main rotation axis between a locking position in which the locking body is fitted in at least a groove obtained in said respective sun gear preventing the respective sun gear from rotating, and a release position in which the locking body is moved away from said groove and said respective sun gear is released.

5. The wheel according to the claim 4, wherein said locking device comprises at least an operating shaft for operating said locking bodies, which is housed in said central holes coaxially to said sun gears and has at least a series of eccentric profiles configured to cooperate with said locking bodies for their movement between said locking position and said release position.

6. The wheel according to the claim 5, wherein angular positions of said eccentric profiles are substantially staggered the one to the other, said operating shaft being rotatable around its own axis in a series of operative angular positions in which one of said eccentric profiles places the corresponding locking body in the locking position while the other locking bodies remain in the release position.

7. The wheel according to claim 5, wherein said speed gear device comprises a solidarization mechanism configured to make said annulus gear integral with said planet carrier body.

8. The wheel according to the claim 7, wherein said solidarization mechanism comprises a solidarization element fastened to said annulus gear in a sliding way along a direction parallel to said main rotation axis between a coupling position in which said solidarization element is rigidly engaged with the primary sun gear, and an idle position in which said solidarization element is moved away and released from said primary sun gear.

9. The wheel according to the claim 8, wherein said solidarization mechanism comprises a helical profile obtained on said operating shaft and configured to cooperate with said solidarization element for its movement between said coupling position and said idle position in contrast to an elastic return body.

10. The wheel according to claim 6, wherein said locking device comprises a retention mechanism configured to retain said operating shaft in said operative angular positions.

11. The wheel according to the claim 10, wherein said retention mechanism comprises at least a retention body fastened to said operating shaft in a sliding way along a direction parallel to said main rotation axis between an engagement position in which said retention body is fitted in a corresponding seat obtained in said fixed structure, and a disengagement position in which said retention body is moved away and released from said seat, said fixed structure having a plurality of said seats with at least one seat for each of said operative angular positions.

12. The wheel according to claim 4, wherein said locking device comprises at least two of said groups of locking bodies, arranged on diametrically opposite sides of said main rotation axis.

13. The wheel according to claim 1, wherein said speed gear device comprises a plurality of said first groups of planet gears.

14. The wheel according to claim 6, wherein said speed gear device comprises a control system for the selection of the transmission ratio by a user which has an actuator element for placing in rotation said operating shaft around its own axis between operative angular positions.

15. The wheel according to the claim 14, wherein said actuator element comprises a coupling body associated with said operating shaft and connectable to a control wire.

16. The wheel according to the claim 14, wherein said actuator element comprises a motorized body.

17. The wheel according to claim 1, wherein said electric motor comprises
a statoric element associated with said fixed structure, and
a rotoric element associated with said circle element,
wherein said statoric element and said rotoric element are substantially ring-shaped and arranged substantially around said motion transmission means.

\* \* \* \* \*